(12) United States Patent
Tigges

(10) Patent No.: US 7,312,806 B2
(45) Date of Patent: Dec. 25, 2007

(54) DYNAMIC WIDTH ADJUSTMENT FOR DETAIL-IN-CONTEXT LENSES

(75) Inventor: Mark H. A. Tigges, North Vancouver (CA)

(73) Assignee: Idelix Software Inc., Vancouver (CA)

( * ) Notice: Subject to any disclaimer, the term of this patent is extended or adjusted under 35 U.S.C. 154(b) by 303 days.

(21) Appl. No.: 11/041,920

(22) Filed: Jan. 25, 2005

(65) Prior Publication Data
US 2005/0162447 A1   Jul. 28, 2005

Related U.S. Application Data

(60) Provisional application No. 60/539,345, filed on Jan. 28, 2004.

(51) Int. Cl.
  G09G 5/00     (2006.01)
  G06T 11/20    (2006.01)
(52) U.S. Cl. ............... 345/647; 345/620; 345/585; 345/440; 345/440.1; 345/441
(58) Field of Classification Search ........... 345/647, 345/585, 620, 440, 440.1, 441
See application file for complete search history.

(56) References Cited

U.S. PATENT DOCUMENTS

| | | | |
|---|---|---|---|
| 5,539,534 A | | 7/1996 | Hino et al. |
| 5,670,984 A | * | 9/1997 | Robertson et al. ......... 345/585 |
| 6,396,648 B1 | | 5/2002 | Yamamoto et al. |
| 6,727,910 B2 | * | 4/2004 | Tigges ...................... 345/647 |
| 6,961,071 B2 | * | 11/2005 | Montagnese et al. ....... 345/647 |
| 7,084,886 B2 | * | 8/2006 | Jetha et al. ................ 345/620 |

OTHER PUBLICATIONS

Marianne S.T. Carpendale, "A Framework for Elastic Presentation Space", Burnaby, British Columbia, Simon Fraser University, 1999.

* cited by examiner

Primary Examiner—Jin-Cheng Wang
(74) Attorney, Agent, or Firm—Joseph Conneely; McCarthy Tetrault LLP

(57) ABSTRACT

A method for reducing occlusion in a presentation of a region-of-interest of an original image, the presentation generated by distorting the original image to produce a lens having a focal region for the region-of-interest at least partially surrounded by a shoulder region defined by a shoulder drop-of function, comprising: scaling the focal region; and, for an input point in the shoulder region, determining a width for the shoulder region from a distance between a projection point for the input point to the focal region and an intersection point on a perimeter of the lens of a line constructed through the input point, the projection point, and the intersection point, to thereby reduce occlusion of the shoulder region by the focal region.

14 Claims, 10 Drawing Sheets

DYNAMIC WIDTH ADJUSTMENT FOR DETAIL-IN-CONTEXT LENSES

This application claims priority from U.S. Provisional Patent Application No. 60/539,345, filed Jan. 28, 2004, and incorporated herein by reference.

FIELD OF THE INVENTION

This invention relates to the field of computer graphics processing, and more specifically, to a method and system for dynamically adjusting detail-in-context lenses in detail-in-context presentations to reduce occlusion of information within the lenses.

BACKGROUND OF THE INVENTION

A detail-in-context presentation may be considered as a distorted view (or distortion) of a region-of-interest in an original image where the distortion is the result of the application of a "lens" like distortion function to the original image. The lens distortion is typically characterized by magnification of a region-of-interest (the "focal region") in an image where detail is desired in combination with compression of a region of the remaining information surrounding the region-of-interest (the "shoulder region"). The area of the image affected by the lens includes the focal region and the shoulder region. These regions define the perimeter of the lens. The shoulder region and the area surrounding the lens provide "context" for the "detail" in the focal region of the lens. The resulting detail-in-context presentation resembles the application of a lens to the image. A detailed review of various detail-in-context presentation techniques such as "Elastic Presentation Space" ("EPS") may be found in a publication by Marianne S. T. Carpendale, entitled "A Framework for Elastic Presentation Space" (Carpendale, Marianne S. T., *A Framework for Elastic Presentation Space* (Burnaby, British Columbia: Simon Fraser University, 1999)), which is incorporated herein by reference.

One problem relating to detail-in-context lenses in detail-in-context presentations is that occlusion of information in the lenses may occur under certain conditions. For example, if the focal region is magnified to the extent that it approaches or meets the perimeter of the lens, the shoulder region may be occluded. Such an event reduces the ability of the detail-in-context presentation to convey the relationship between the detail in the focal region and the context in the surrounding image.

A need therefore exists for a method and system for reducing shoulder region occlusion in detail-in-context presentations. Accordingly, a solution that addresses, at least in part, the above and other shortcomings is desired.

SUMMARY OF THE INVENTION

According to one aspect of the invention, there is provided a method for reducing occlusion in a presentation of a region-of-interest of an original image, the presentation generated by distorting the original image to produce a lens having a focal region for the region-of-interest at least partially surrounded by a shoulder region defined by a shoulder drop-of function, comprising: scaling the focal region; and, for an input point in the shoulder region, determining a width for the shoulder region from a distance between a projection point for the input point to the focal region and an intersection point on a perimeter of the lens of a line constructed through the input point, the projection point, and the intersection point, to thereby reduce occlusion of the shoulder region by the focal region.

Preferably, the method further includes determining the projection point by projecting the input point to a nearest point on the focal region.

Preferably, the method further includes determining the intersection point by finding a root for a function defined by the shoulder drop-off function and a difference between the input point and the projection point.

Preferably, the finding is performed by a root finding algorithm.

Preferably, the method further includes determining first and second bracketing points for the root.

Preferably, the root finding algorithm is Brents algorithm.

Preferably, the shoulder drop-off function is smooth.

Preferably, the shoulder drop-off function is monotonic.

Preferably, the method further includes displaying the presentation on a display screen.

Preferably, the method further includes displaying a graphical user interface ("GUI") over the lens for adjusting the lens.

Preferably, the GUI has means for adjusting at least one of: a magnification for the focal region; a degree of scooping for the shoulder region; a size and a shape for the focal region; a size and a shape for the perimeter; a location for the lens within the original image; a location for the perimeter within the original image; and, a location for the focal region relative to the perimeter.

Preferably, the adjusting is performed by moving a cursor on the display screen with a pointing device.

Preferably, at least some of the means are icons.

In accordance with further aspects of the present invention there is provided an apparatus such as a data processing system, a method for adapting this system, as well as articles of manufacture such as a computer readable medium having program instructions recorded thereon for practicing the method of the invention.

BRIEF DESCRIPTION OF THE DRAWINGS

Further features and advantages of the embodiments of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENTS

Figure 1:
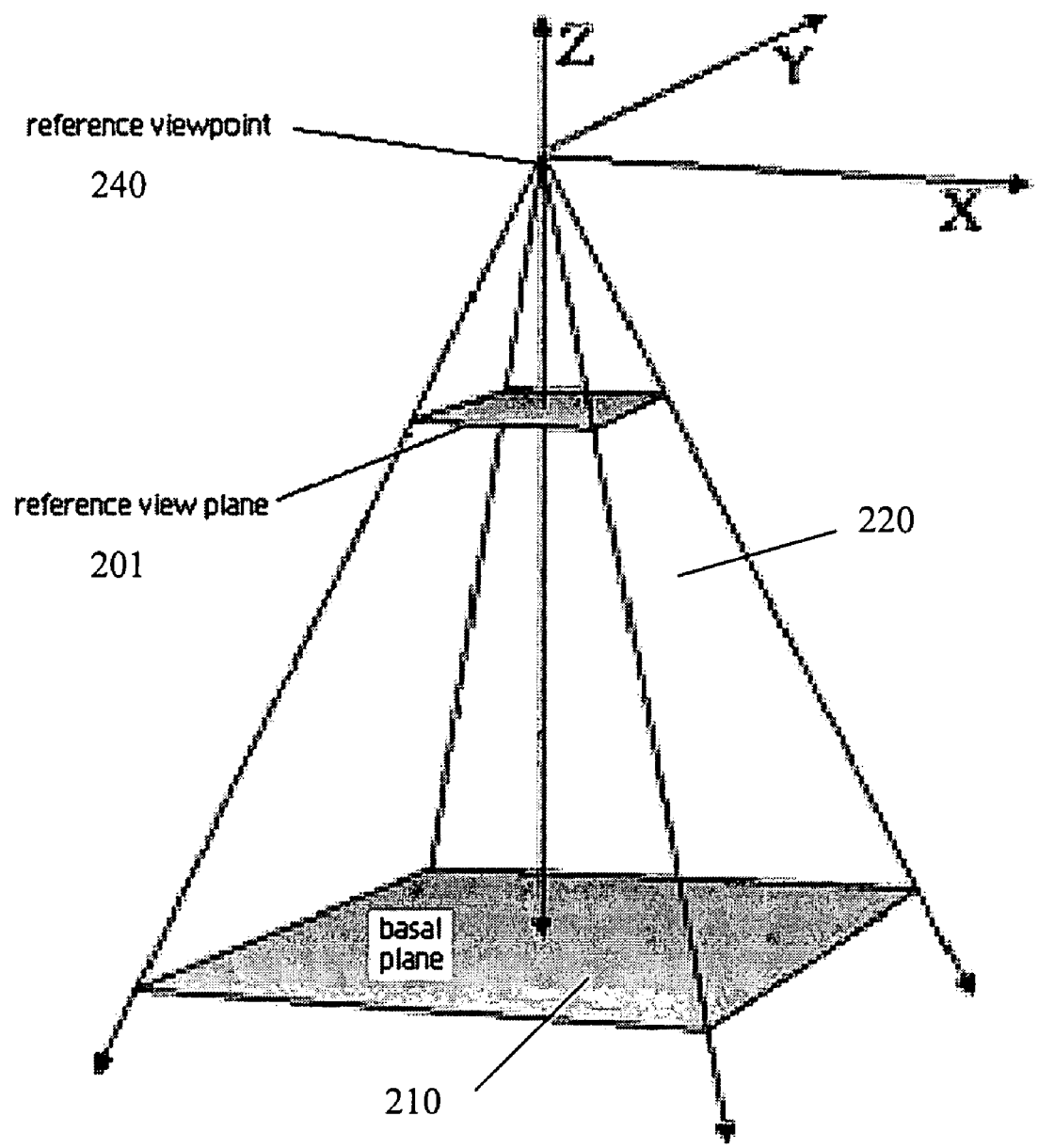
FIG. 1 is a graphical representation of the geometry for constructing a three-dimensional perspective viewing frustum, relative to an x, y, z coordinate system, in accordance with known elastic presentation space graphics technology.

In the following description, numerous specific details are set forth to provide a thorough understanding of the invention. However, it is understood that the invention may be practiced without these specific details. In other instances, well-known software, circuits, structures and techniques have not been described or shown in detail in order not to obscure the invention. The term "data processing system" is used herein to refer to any machine for processing data, including the computer systems and network arrangements described herein. The present invention may be implemented in any computer programming language provided that the operating system of the data processing system provides the facilities that may support the requirements of the present invention. Any limitations presented would be a result of a particular type of operating system or computer programming language and would not be a limitation of the present invention.

For reference, the "screen real estate problem" generally arises whenever large amounts of information are to be displayed on a display screen of limited size. Known tools to address this problem include panning and zooming. While these tools are suitable for a large number of visual display applications, they become less effective where sections of the visual information are spatially related, such as in layered maps and three-dimensional representations, for example. In this type of information display, panning and zooming are not as effective as much of the context of the panned or zoomed display may be hidden.

A recent solution to this problem is the application of "detail-in-context" presentation techniques. Detail-in-context is the magnification of a particular region-of-interest (the "focal region" or "detail") in a data presentation while preserving visibility of the surrounding information (the "context"). This technique has applicability to the display of large surface area media (e.g. digital maps) on computer screens of variable size including graphics workstations, laptop computers, personal digital assistants ("PDAs"), and cell phones.

In the detail-in-context discourse, differentiation is often made between the terms "representation" and "presentation". A representation is a formal system, or mapping, for specifying raw information or data that is stored in a computer or data processing system. For example, a digital map of a city is a representation of raw data including street names and the relative geographic location of streets and utilities. Such a representation may be displayed visually on a computer screen or printed on paper. On the other hand, a presentation is a spatial organization of a given representation that is appropriate for the task at hand. Thus, a presentation of a representation organizes such things as the point of view and the relative emphasis of different parts or regions of the representation. For example, a digital map of a city may be presented with a region magnified to reveal street names.

As mentioned above, a detail-in-context presentation may be considered as a distorted view (or distortion) of a portion of the original representation or image where the distortion is the result of the application of a "lens" like distortion function to the original representation. A detailed review of various detail-in-context presentation techniques such as "Elastic Presentation Space" ("EPS") (or "Pliable Display Technology" ("PDT")) may be found in a publication by Marianne S. T. Carpendale, entitled "A Framework for Elastic Presentation Space" (Carpendale, Marianne S. T., *A Framework for Elastic Presentation Space* (Burnaby, British Columbia: Simon Fraser University, 1999)), which is incorporated herein by reference.

In general, detail-in-context data presentations are characterized by magnification of areas of an image where detail is desired, in combination with compression of a restricted range of areas of the remaining information (i.e. the context), the result typically giving the appearance of a lens having been applied to the display surface. Using the techniques described by Carpendale, points in a representation are displaced in three dimensions and a perspective projection is used to display the points on a two-dimensional presentation display. Thus, when a lens is applied to a two-dimensional continuous surface representation, for example, the resulting presentation appears to be three-dimensional. In other words, the lens transformation appears to have stretched the continuous surface in a third dimension. In EPS graphics technology, a two-dimensional visual representation is placed onto a surface; this surface is placed in three-dimensional space; the surface, containing the representation, is viewed through perspective projection; and the surface is manipulated to effect the reorganization of image details. The presentation transformation is separated into two steps: surface manipulation or distortion and perspective projection.

FIG. 1 is a graphical representation 100 of the geometry for constructing a three-dimensional ("3D") perspective viewing frustum 220, relative to an x, y, z coordinate system, in accordance with known elastic presentation space (EPS) graphics technology. In EPS technology, detail-in-context views of two-dimensional ("2D") visual representations are created with sight-line aligned distortions of a 2D information presentation surface within a 3D perspective viewing frustum 220. In EPS, magnification of regions of interest and the accompanying compression of the contextual region to accommodate this change in scale are produced by the movement of regions of the surface towards the viewpoint ("VP") 240 located at the apex of the pyramidal shape 220 containing the frustum. The process of projecting these transformed layouts via a perspective projection results in a new 2D layout which includes the zoomed and compressed regions. The use of the third dimension and perspective distortion to provide magnification in EPS provides a meaningful metaphor for the process of distorting the information presentation surface. The 3D manipulation of the information presentation surface in such a system is an intermediate step in the process of creating a new 2D layout of the information.

Figure 2:
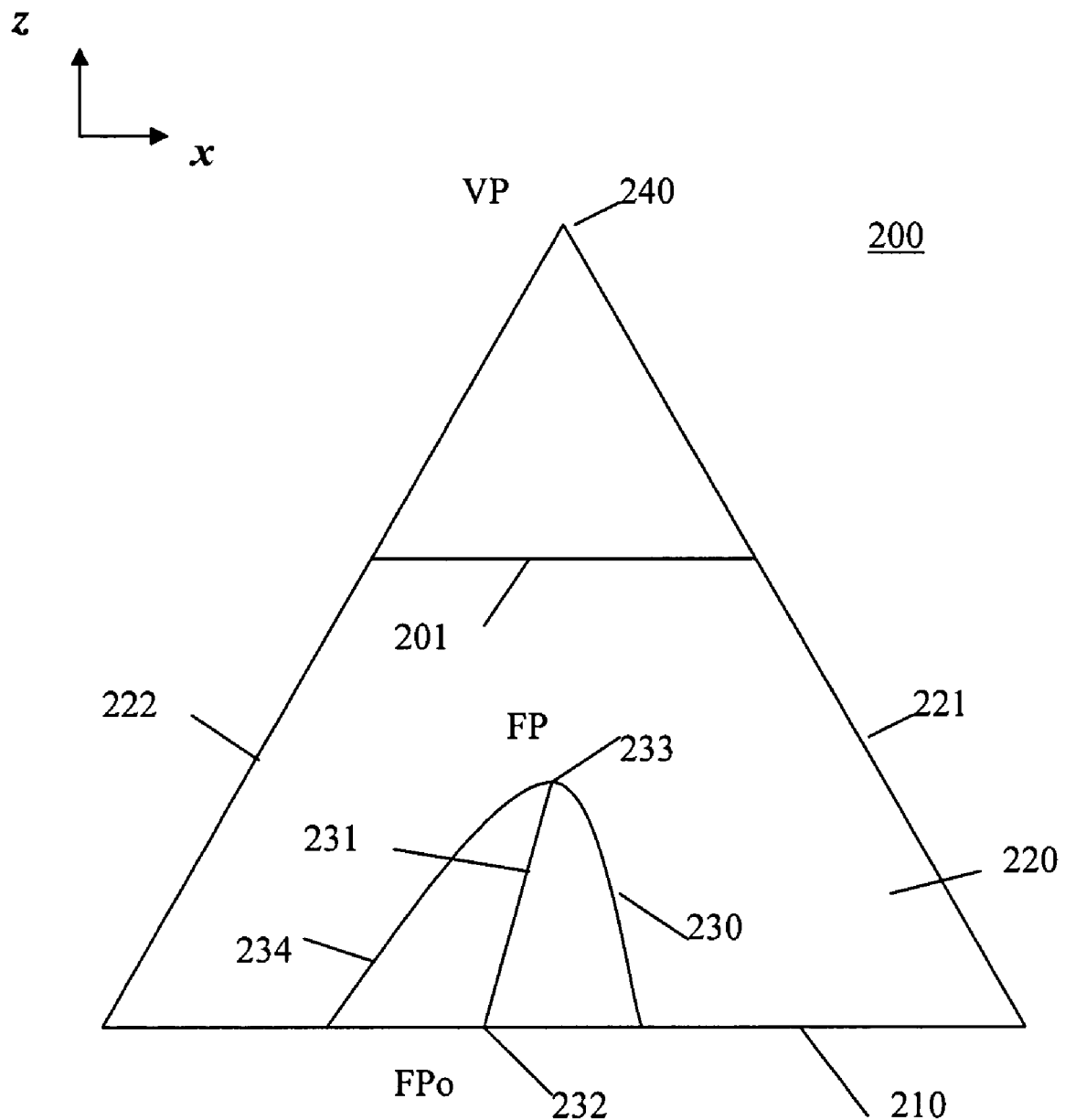
FIG. 2 is a graphical representation of the geometry of a presentation in accordance with known elastic presentation space graphics technology.

FIG. 2 is a graphical representation of the geometry 200 of a presentation in accordance with known EPS graphics technology. EPS graphics technology employs viewer-aligned perspective projections to produce detail-in-context presentations in a reference view plane 201 which may be viewed on a display. Undistorted 2D data points are located in a basal plane 210 of a 3D perspective viewing volume or frustum 220 which is defined by extreme rays 221 and 222 and the basal plane 210. The VP 240 is generally located above the centre point of the basal plane 210 and reference view plane ("RVP") 201. Points in the basal plane 210 are displaced upward onto a distorted surface 230 which is defined by a general 3D distortion function (i.e. a detail-in-context distortion basis function). The direction of the perspective projection corresponding to the distorted surface 230 is indicated by the line FPo-FP 231 drawn from a point FPo 232 in the basal plane 210 through the point FP 233 which corresponds to the focus or focal region or focal point of the distorted surface 230. Typically, the perspective projection has a direction 231 that is viewer-aligned (i.e., the points FPo 232, FP 233, and VP 240 are collinear).

EPS is applicable to multidimensional data and is well suited to implementation on a computer for dynamic detail-in-context display on an electronic display surface such as a monitor. In the case of two dimensional data, EPS is typically characterized by magnification of areas of an image where detail is desired 233, in combination with compression of a restricted range of areas of the remaining information (i.e. the context) 234, the end result typically giving the appearance of a lens 230 having been applied to the display surface. The areas of the lens 230 where compression occurs may be referred to as the "shoulder" 234 of the lens 230. The area of the representation transformed by the lens may be referred to as the "lensed area". The lensed area thus includes the focal region and the shoulder. To reiterate, the source image or representation to be viewed is located in the basal plane 210. Magnification 233 and compression 234 are achieved through elevating elements of the source image relative to the basal plane 210, and then projecting the resultant distorted surface onto the reference view plane 201. EPS performs detail-in-context presentation of n-dimensional data through the use of a procedure wherein the data is mapped into a region in an (n+1) dimensional space, manipulated through perspective projections in the (n+1) dimensional space, and then finally transformed back into n-dimensional space for presentation. EPS has numerous advantages over conventional zoom, pan, and scroll technologies, including the capability of preserving the visibility of information outside 234 the local region of interest 233.

For example, and referring to FIGS. 1 and 2, in two dimensions, EPS can be implemented through the projection of an image onto a reference plane 201 in the following manner. The source image or representation is located on a basal plane 210, and those regions of interest 233 of the image for which magnification is desired are elevated so as to move them closer to a reference plane situated between the reference viewpoint 240 and the reference view plane 201. Magnification of the focal region 233 closest to the RVP 201 varies inversely with distance from the RVP 201. As shown in FIGS. 1 and 2, compression of regions 234 outside the focal region 233 is a function of both distance from the RVP 201, and the gradient of the function describing the vertical distance from the RVP 201 with respect to horizontal distance from the focal region 233. The resultant combination of magnification 233 and compression 234 of the image as seen from the reference viewpoint 240 results in a lens-like effect similar to that of a magnifying glass applied to the image. Hence, the various functions used to vary the magnification and compression of the source image via vertical displacement from the basal plane 210 are described as lenses, lens types, or lens functions. Lens functions that describe basic lens types with point and circular focal regions, as well as certain more complex lenses and advanced capabilities such as folding, have previously been described by Carpendale.

Figure 3:
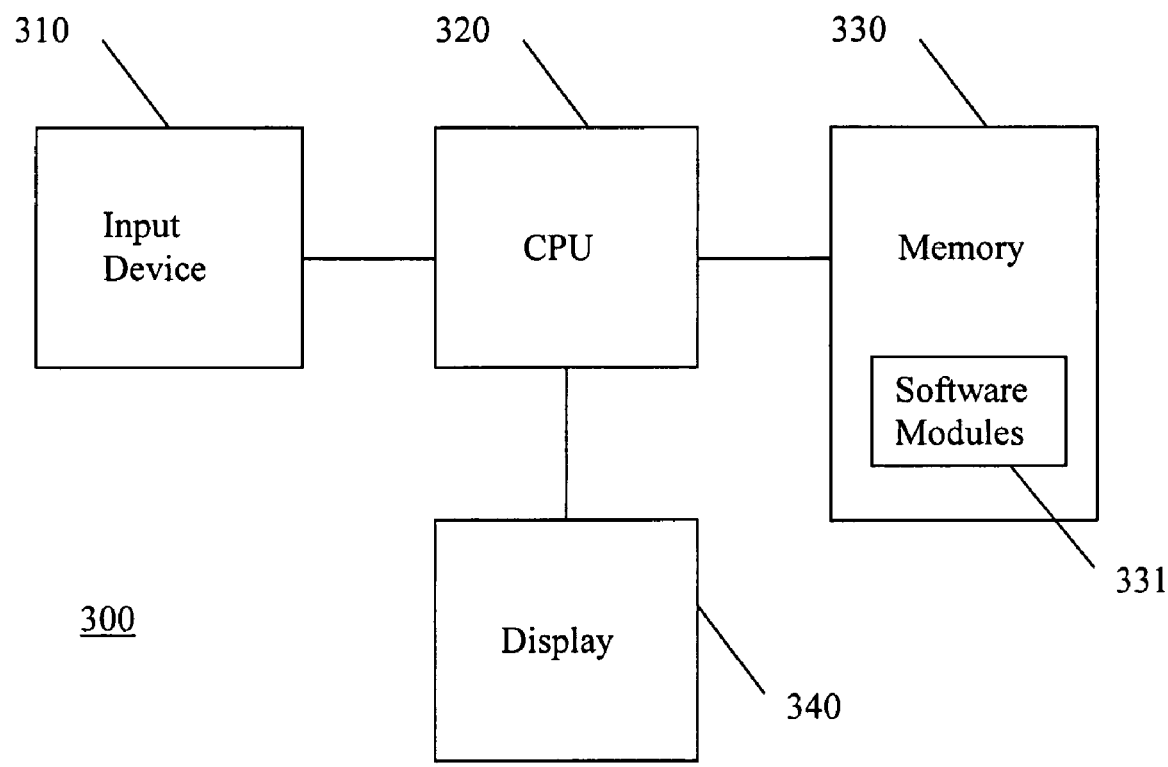
FIG. 3 is a block diagram illustrating a data processing system adapted for implementing an embodiment of the invention.

FIG. 3 is a block diagram of a data processing system 300 adapted to implement an embodiment of the invention. The data processing system 300 is suitable for implementing EPS technology, for displaying detail-in-context presentations of representations in conjunction with a detail-in-context graphical user interface (GUI) 400, as described below, and for dynamically adjusting the width of detail-in-context lenses to reduce occlusion. The data processing system 300 includes an input device 310, a central processing unit ("CPU") 320, memory 330, and a display 340. The input device 310 may include a keyboard, mouse, trackball, or similar device. The CPU 320 may include dedicated coprocessors and memory devices. The memory 330 may include RAM, ROM, databases, or disk devices. And, the display 340 may include a computer screen, terminal device, or a hardcopy producing output device such as a printer or plotter. The data processing system 300 has stored therein data representing sequences of instructions which when executed cause the method described herein to be performed. Of course, the data processing system 300 may contain additional software and hardware a description of which is not necessary for understanding the invention.

Thus, the data processing system 300 includes computer executable programmed instructions for directing the system 300 to implement the embodiments of the present invention. The programmed instructions may be embodied in one or more software modules 331 resident in the memory 330 of the data processing system 300. Alternatively, the programmed instructions may be embodied on a computer readable medium (such as a CD disk or floppy disk) which may be used for transporting the programmed instructions to the memory 330 of the data processing system 300. Alternatively, the programmed instructions may be embedded in a computer-readable, signal-bearing medium that is uploaded to a network by a vendor or supplier of the programmed instructions, and this signal-bearing medium may be downloaded through an interface to the data processing system 300 from the network by end users or potential buyers.

As mentioned, detail-in-context presentations of data using techniques such as pliable surfaces, as described by Carpendale, are useful in presenting large amounts of information on limited-size display surfaces. Detail-in-context views allow magnification of a particular region-of-interest (the "focal region") 233 in a data presentation while preserving visibility of the surrounding information 210. In the following, a GUI 400 is described having lens control elements that can be implemented in software and applied to the editing of multi-layer images and to the control of detail-in-context data presentations. The software can be loaded into and run by the data processing system 300 of FIG. 3.

Figure 4:
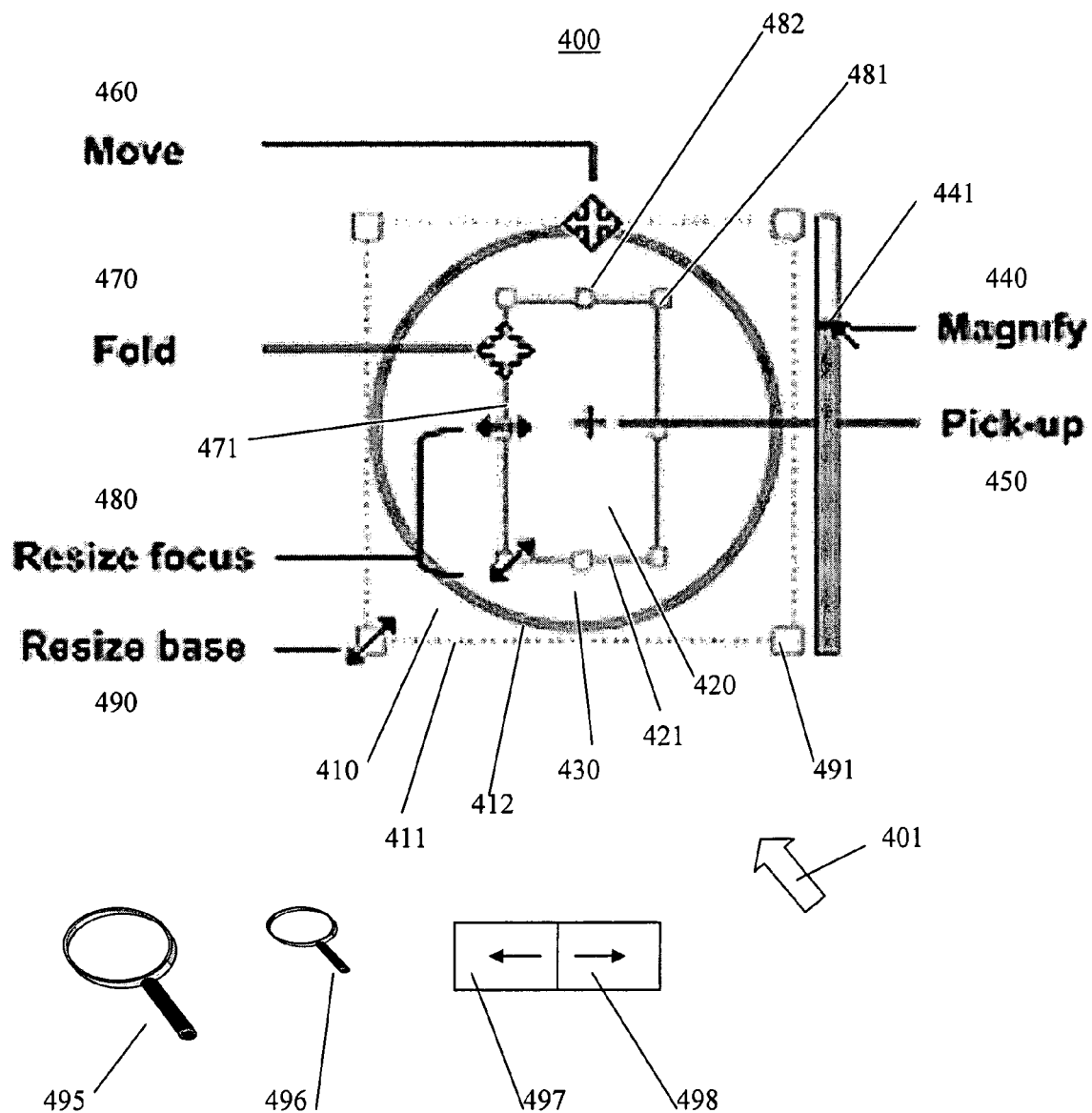
FIG. 4 a partial screen capture illustrating a GUI having lens control elements for user interaction with detail-in-context data presentations in accordance with an embodiment of the invention.

FIG. 4 is a partial screen capture illustrating a GUI 400 having lens control elements for user interaction with detail-in-context data presentations in accordance with an embodiment of the invention. Detail-in-context data presentations are characterized by magnification of areas of an image where detail is desired, in combination with compression of a restricted range of areas of the remaining information (i.e. the context), the end result typically giving the appearance of a lens having been applied to the display screen surface. This lens 410 includes a "focal region" 420 having high magnification, a surrounding "shoulder region" 430 where information is typically visibly compressed, and a "base" 412 surrounding the shoulder region 430 and defining the extent of the lens 410. In FIG. 4, the lens 410 is shown with a circular shaped base 412 (or outline) and with a focal region 420 lying near the center of the lens 410. However, the lens 410 and focal region 420 may have any desired shape. As mentioned above, the base of the lens 412 may be coextensive with the focal region 420.

In general, the GUI 400 has lens control elements that, in combination, provide for the interactive control of the lens 410. The effective control of the characteristics of the lens 410 by a user (i.e. dynamic interaction with a detail-in-context lens) is advantageous. At any given time, one or more of these lens control elements may be made visible to the user on the display surface 340 by appearing as overlay icons on the lens 410. Interaction with each element is performed via the motion of an input or pointing device 310 (e.g. mouse), with the motion resulting in an appropriate change in the corresponding lens characteristic. As will be described, selection of which lens control element is actively controlled by the motion of the pointing device 310 at any given time is determined by the proximity of the icon representing the pointing device 310 (e.g. cursor) on the display surface 340 to the appropriate component of the lens 410. For example, "dragging" of the pointing device at the periphery of the bounding rectangle of the lens base 412 causes a corresponding change in the size of the lens 410 (i.e. "resizing"). Thus, the GUI 400 provides the user with a visual representation of which lens control element is being adjusted through the display of one or more corresponding icons.

For ease of understanding, the following discussion will be in the context of using a two-dimensional pointing device 310 that is a mouse, but it will be understood that the invention may be practiced with other 2D or 3D (or even greater numbers of dimensions) pointing devices including a trackball and keyboard.

A mouse 310 controls the position of a cursor icon 401 that is displayed on the display screen 340. The cursor 401 is moved by moving the mouse 310 over a flat surface, such as the top of a desk, in the desired direction of movement of the cursor 401. Thus, the two-dimensional movement of the mouse 310 on the flat surface translates into a corresponding two-dimensional movement of the cursor 401 on the display screen 340.

A mouse 310 typically has one or more finger actuated control buttons (i.e. mouse buttons). While the mouse buttons can be used for different functions such as selecting a menu option pointed at by the cursor 401, the disclosed invention may use a single mouse button to "select" a lens 410 and to trace the movement of the cursor 401 along a desired path. Specifically, to select a lens 410, the cursor 401 is first located within the extent of the lens 410. In other words, the cursor 401 is "pointed" at the lens 410. Next, the mouse button is depressed and released. That is, the mouse button is "clicked". Selection is thus a point and click operation. To trace the movement of the cursor 401, the cursor 401 is located at the desired starting location, the mouse button is depressed to signal the computer 320 to activate a lens control element, and the mouse 310 is moved while maintaining the button depressed. After the desired path has been traced, the mouse button is released. This procedure is often referred to as "clicking" and "dragging" (i.e. a click and drag operation). It will be understood that a predetermined key on a keyboard 310 could also be used to activate a mouse click or drag. In the following, the term "clicking" will refer to the depression of a mouse button indicating a selection by the user and the term "dragging" will refer to the subsequent motion of the mouse 310 and cursor 401 without the release of the mouse button.

The GUI 400 may include the following lens control elements: move, pickup, resize base, resize focus, fold, magnify, zoom, and scoop. Each of these lens control elements has at least one lens control icon or alternate cursor icon associated with it. In general, when a lens 410 is selected by a user through a point and click operation, the following lens control icons may be displayed over the lens 410: pickup icon 450, base outline icon 412, base bounding rectangle icon 411, focal region bounding rectangle icon 421, handle icons 481, 482, 491 magnify slide bar icon 440, zoom icon 495, and scoop slide bar icon (not shown). Typically, these icons are displayed simultaneously after selection of the lens 410. In addition, when the cursor 401 is located within the extent of a selected lens 410, an alternate cursor icon 460, 470, 480, 490, 495 may be displayed over the lens 410 to replace the cursor 401 or may be displayed in combination with the cursor 401. These lens control elements, corresponding icons, and their effects on the characteristics of a lens 410 are described below with reference to FIG. 4.

In general, when a lens 410 is selected by a point and click operation, bounding rectangle icons 411, 421 are displayed surrounding the base 412 and focal region 420 of the selected lens 410 to indicate that the lens 410 has been selected. With respect to the bounding rectangles 411, 421 one might view them as glass windows enclosing the lens base 412 and focal region 420, respectively. The bounding rectangles 411, 421 include handle icons 481, 482, 491 allowing for direct manipulation of the enclosed base 412 and focal region 420 as will be explained below. Thus, the bounding rectangles 411, 421 not only inform the user that the lens 410 has been selected, but also provide the user with indications as to what manipulation operations might be possible for the selected lens 410 though use of the displayed handles 481, 482, 491. Note that it is well within the scope of the present invention to provide a bounding region having a shape other than generally rectangular. Such a bounding region could be of any of a great number of shapes including oblong, oval, ovoid, conical, cubic, cylindrical, polyhedral, spherical, etc.

Moreover, the cursor 401 provides a visual cue indicating the nature of an available lens control element. As such, the cursor 401 will generally change in form by simply pointing to a different lens control icon 450, 412, 411, 421, 481, 482, 491, 440. For example, when resizing the base 412 of a lens 410 using a corner handle 491, the cursor 401 will change form to a resize icon 490 once it is pointed at (i.e. positioned over) the corner handle 491. The cursor 401 will remain in the form of the resize icon 490 until the cursor 401 has been moved away from the corner handle 491.

Lateral movement of a lens 410 is provided by the move lens control element of the GUI 400. This functionality is accomplished by the user first selecting the lens 410 through a point and click operation. Then, the user points to a point within the lens 410 that is other than a point lying on a lens control icon 450, 412, 411, 421, 481, 482, 491, 440. When the cursor 401 is so located, a move icon 460 is displayed over the lens 410 to replace the cursor 401 or may be displayed in combination with the cursor 401. The move icon 460 not only informs the user that the lens 410 may be moved, but also provides the user with indications as to what movement operations are possible for the selected lens 410. For example, the move icon 460 may include arrowheads indicating up, down, left, and right motion. Next, the lens 410 is moved by a click and drag operation in which the user clicks and drags the lens 410 to the desired position on the screen 340 and then releases the mouse button 310. The lens 410 is locked in its new position until a further pickup and move operation is performed.

Lateral movement of a lens 410 is also provided by the pickup lens control element of the GUI. This functionality is accomplished by the user first selecting the lens 410 through a point and click operation. As mentioned above, when the lens 410 is selected a pickup icon 450 is displayed over the lens 410 near the centre of the lens 410. Typically, the pickup icon 450 will be a crosshairs. In addition, a base outline 412 is displayed over the lens 410 representing the base 412 of the lens 410. The crosshairs 450 and lens outline 412 not only inform the user that the lens has been selected, but also provides the user with an indication as to the pickup operation that is possible for the selected lens 410. Next, the user points at the crosshairs 450 with the cursor 401. Then, the lens outline 412 is moved by a click and drag operation in which the user clicks and drags the crosshairs 450 to the desired position on the screen 340 and then releases the mouse button 310. The full lens 410 is then moved to the new position and is locked there until a further pickup operation is performed. In contrast to the move operation described above, with the pickup operation, it is the outline 412 of the lens 410 that the user repositions rather than the full lens 410.

Resizing of the base 412 (or outline) of a lens 410 is provided by the resize base lens control element of the GUI. After the lens 410 is selected, a bounding rectangle icon 411 is displayed surrounding the base 412. For a rectangular shaped base 412, the bounding rectangle icon 411 may be coextensive with the perimeter of the base 412. The bounding rectangle 411 includes handles 491. These handles 491 can be used to stretch the base 412 taller or shorter, wider or narrower, or proportionally larger or smaller. The corner handles 491 will keep the proportions the same while changing the size. The middle handles (not shown) will make the base 412 taller or shorter, wider or narrower. Resizing the base 412 by the corner handles 491 will keep the base 412 in proportion. Resizing the base 412 by the middle handles will change the proportions of the base 412. That is, the middle handles change the aspect ratio of the base 412 (i.e. the ratio between the height and the width of the bounding rectangle 411 of the base 412). When a user points at a handle 491 with the cursor 401 a resize icon 490 may be displayed over the handle 491 to replace the cursor 401 or may be displayed in combination with the cursor 401. The resize icon 490 not only informs the user that the handle 491 may be selected, but also provides the user with indications as to the resizing operations that are possible with the selected handle. For example, the resize icon 490 for a corner handle 491 may include arrows indicating proportional resizing. The resize icon (not shown) for a middle handle may include arrows indicating width resizing or height resizing. After pointing at the desired handle 491 the user would click and drag the handle 491 until the desired shape and size for the base 412 is reached. Once the desired shape and size are reached, the user would release the mouse button 310. The base 412 of the lens 410 is then locked in its new size and shape until a further base resize operation is performed.

Resizing of the focal region 420 of a lens 410 is provided by the resize focus lens control element of the GUI. After the lens 410 is selected, a bounding rectangle icon 421 is displayed surrounding the focal region 420. For a rectangular shaped focal region 420, the bounding rectangle icon 421 may be coextensive with the perimeter of the focal region 420. The bounding rectangle 421 includes handles 481, 482. These handles 481, 482 can be used to stretch the focal region 420 taller or shorter, wider or narrower, or proportionally larger or smaller. The corner handles 481 will keep the proportions the same while changing the size. The middle handles 482 will make the focal region 420 taller or shorter, wider or narrower. Resizing the focal region 420 by the corner handles 481 will keep the focal region 420 in proportion. Resizing the focal region 420 by the middle handles 482 will change the proportions of the focal region 420. That is, the middle handles 482 change the aspect ratio of the focal region 420 (i.e. the ratio between the height and the width of the bounding rectangle 421 of the focal region 420). When a user points at a handle 481, 482 with the cursor 401 a resize icon 480 may be displayed over the handle 481, 482 to replace the cursor 401 or may be displayed in combination with the cursor 401. The resize icon 480 not only informs the user that a handle 481, 482 may be selected, but also provides the user with indications as to the resizing operations that are possible with the selected handle. For example, the resize icon 480 for a corner handle 481 may include arrows indicating proportional resizing. The resize icon 480 for a middle handle 482 may include arrows indicating width resizing or height resizing. After pointing at the desired handle 481, 482, the user would click and drag the handle 481, 482 until the desired shape and size for the focal region 420 is reached. Once the desired shape and size are reached, the user would release the mouse button 310. The focal region 420 is then locked in its new size and shape until a further focus resize operation is performed.

Folding of the focal region 420 of a lens 410 is provided by the fold control element of the GUI. In general, control of the degree and direction of folding (i.e., skewing of the viewer aligned vector 231 as described by Carpendale) is accomplished by a click and drag operation on a point 471, other than a handle 481, 482, on the bounding rectangle 421 surrounding the focal region 420. The direction of folding is determined by the direction in which the point 471 is dragged. The degree of folding is determined by the magnitude of the translation of the cursor 401 during the drag. In general, the direction and degree of folding corresponds to the relative displacement of the focus 420 with respect to the lens base 410. In other words, and referring to FIG. 2, the direction and degree of folding corresponds to the displacement of the point FP 233 relative to the point FPo 232, where the vector joining the points FPo 232 and FP 233 defines the viewer aligned vector 231. In particular, after the lens 410 is selected, a bounding rectangle icon 421 is displayed surrounding the focal region 420. The bounding rectangle 421 includes handles 481, 482. When a user points at a point 471, other than a handle 481, 482, on the bounding rectangle 421 surrounding the focal region 420 with the cursor 401, a fold icon 470 may be displayed over the point 471 to replace the cursor 401 or may be displayed in combination with the cursor 401. The fold icon 470 not only informs the user that a point 471 on the bounding rectangle 421 may be selected, but also provides the user with indications as to what fold operations are possible. For example, the fold icon 470 may include arrowheads indicating up, down, left, and right motion. By choosing a point 471, other than a handle 481, 482, on the bounding rectangle 421 a user may control the degree and direction of folding. To control the direction of folding, the user would click on the point 471 and drag in the desired direction of folding. To control the degree of folding, the user would drag to a greater or lesser degree in the desired direction of folding. Once the desired direction and degree of folding is reached, the user would release the mouse button 310. The lens 410 is then locked with the selected fold until a further fold operation is performed.

Magnification of the lens 410 is provided by the magnify lens control element of the GUI. After the lens 410 is selected, the magnify control is presented to the user as a slide bar icon 440 near or adjacent to the lens 410 and typically to one side of the lens 410. Sliding the bar 441 of the slide bar 440 results in a proportional change in the magnification of the lens 410. The slide bar 440 not only informs the user that magnification of the lens 410 may be selected, but also provides the user with an indication as to what level of magnification is possible. The slide bar 440 includes a bar 441 that may be slid up and down, or left and right, to adjust and indicate the level of magnification. To control the level of magnification, the user would click on the bar 441 of the slide bar 440 and drag in the direction of desired magnification level. Once the desired level of magnification is reached, the user would release the mouse button 310. The lens 410 is then locked with the selected magnification until a further magnification operation is performed. In general, the focal region 420 is an area of the lens 410 having constant magnification (i.e. if the focal region is a plane). Again referring to FIGS. 1 and 2, magnification of the focal region 420, 233 varies inversely with the distance from the focal region 420, 233 to the reference view plane (RVP) 201. Magnification of areas lying in the shoulder region 430 of the lens 410 also varies inversely with their distance from the RVP 201. Thus, magnification of areas lying in the shoulder region 430 will range from unity at the base 412 to the level of magnification of the focal region 420.

Zoom functionality is provided by the zoom lens control element of the GUI. Referring to FIG. 2, the zoom lens control element, for example, allows a user to quickly navigate to a region of interest 233 within a continuous view of a larger presentation 210 and then zoom in to that region of interest 233 for detailed viewing or editing. Referring to FIG. 4, the combined presentation area covered by the focal region 420 and shoulder region 430 and surrounded by the base 412 may be referred to as the "extent of the lens". Similarly, the presentation area covered by the focal region 420 may be referred to as the "extent of the focal region". The extent of the lens may be indicated to a user by a base bounding rectangle 411 when the lens 410 is selected. The extent of the lens may also be indicated by an arbitrarily shaped figure that bounds or is coincident with the perimeter of the base 412. Similarly, the extent of the focal region may be indicated by a second bounding rectangle 421 or arbitrarily shaped figure. The zoom lens control element allows a user to: (a) "zoom in" to the extent of the focal region such that the extent of the focal region fills the display screen 340 (i.e. "zoom to focal region extent"); (b) "zoom in" to the extent of the lens such that the extent of the lens fills the display screen 340 (i.e. "zoom to lens extent"); or, (c) "zoom in" to the area lying outside of the extent of the focal region such that the area without the focal region is magnified to the same level as the extent of the focal region (i.e. "zoom to scale").

In particular, after the lens 410 is selected, a bounding rectangle icon 411 is displayed surrounding the base 412 and a bounding rectangle icon 421 is displayed surrounding the focal region 420. Zoom functionality is accomplished by the user first selecting the zoom icon 495 through a point and click operation When a user selects zoom functionality, a zoom cursor icon 496 may be displayed to replace the cursor 401 or may be displayed in combination with the cursor 401. The zoom cursor icon 496 provides the user with indications as to what zoom operations are possible. For example, the zoom cursor icon 496 may include a magnifying glass. By choosing a point within the extent of the focal region, within the extent of the lens, or without the extent of the lens, the user may control the zoom function. To zoom in to the extent of the focal region such that the extent of the focal region fills the display screen 340 (i.e. "zoom to focal region extent"), the user would point and click within the extent of the focal region. To zoom in to the extent of the lens such that the extent of the lens fills the display screen 340 (i.e. "zoom to lens extent"), the user would point and click within the extent of the lens. Or, to zoom in to the presentation area without the extent of the focal region, such that the area without the extent of the focal region is magnified to the same level as the extent of the focal region (i.e. "zoom to scale"), the user would point and click without the extent of the lens. After the point and click operation is complete, the presentation is locked with the selected zoom until a further zoom operation is performed.

Alternatively, rather than choosing a point within the extent of the focal region, within the extent of the lens, or without the extent of the lens to select the zoom function, a zoom function menu with multiple items (not shown) or multiple zoom function icons (not shown) may be used for zoom function selection. The zoom function menu may be presented as a pull-down menu. The zoom function icons may be presented in a toolbar (not shown) or adjacent to the lens 410 when the lens is selected. Individual zoom function menu items or zoom function icons may be provided for each of the "zoom to focal region extent", "zoom to lens extent", and "zoom to scale" functions described above. In this alternative, after the lens 410 is selected, a bounding rectangle icon 411 may be displayed surrounding the base 412 and a bounding rectangle icon 421 may be displayed surrounding the focal region 420. Zoom functionality is accomplished by the user selecting a zoom function from the zoom function menu or via the zoom function icons using a point and click operation. In this way, a zoom function may be selected without considering the position of the cursor 401 within the lens 410.

The concavity or "scoop" of the shoulder region 430 of the lens 410 is provided by the scoop lens control element of the GUI. After the lens 410 is selected, the scoop control is presented to the user as a slide bar icon (not shown) near or adjacent to the lens 410 and typically below the lens 410. Sliding the bar (not shown) of the slide bar results in a proportional change in the concavity or scoop of the shoulder region 430 of the lens 410. The slide bar not only informs the user that the shape of the shoulder region 430 of the lens 410 may be selected, but also provides the user with an indication as to what degree of shaping is possible. The slide bar includes a bar that may be slid left and right, or up and down, to adjust and indicate the degree of scooping. To control the degree of scooping, the user would click on the bar of the slide bar and drag in the direction of desired scooping degree. Once the desired degree of scooping is reached, the user would release the mouse button 310. The lens 410 is then locked with the selected scoop until a further scooping operation is performed.

Advantageously, a user may choose to hide one or more lens control icons 450, 412, 411, 421, 481, 482, 491, 440, 495 shown in FIG. 4 from view so as not to impede the user's view of the image within the lens 410. This may be helpful, for example, during an editing or move operation. A user may select this option through means such as a menu, toolbar, or lens property dialog box.

In addition, the GUI 400 maintains a record of control element operations such that the user may restore pre-operation presentations. This record of operations may be accessed by or presented to the user through "Undo" and "Redo" icons 497, 498, through a pull-down operation history menu (not shown), or through a toolbar.

Thus, detail-in-context data viewing techniques allow a user to view multiple levels of detail or resolution on one display 340. The appearance of the data display or presentation is that of one or more virtual lenses showing detail 233 within the context of a larger area view 210. Using multiple lenses in detail-in-context data presentations may be used to compare two regions of interest at the same time. Folding enhances this comparison by allowing the user to pull the regions of interest closer together. Moreover, using detail-in-context technology such as PDT, an area of interest can be magnified to pixel level resolution, or to any level of detail available from the source information, for in-depth review. The digital images may include graphic images, maps, photographic images, or text documents, and the source information may be in raster, vector, or text form.

For example, in order to view a selected object or area in detail, a user can define a lens 410 over the object using the GUI 400. The lens 410 may be introduced to the original image to form the a presentation through the use of a pull-down menu selection, tool bar icon, etc. Using lens control elements for the GUI 400, such as move, pickup, resize base, resize focus, fold, magnify, zoom, and scoop, as described above, the user adjusts the lens 410 for detailed viewing of the object or area. Using the magnify lens control element, for example, the user may magnify the focal region 420 of the lens 410 to pixel quality resolution revealing detailed information pertaining to the selected object or area. That is, a base image (i.e., the image outside the extent of the lens) is displayed at a low resolution while a lens image (i.e., the image within the extent of the lens) is displayed at a resolution based on a user selected magnification 440, 441.

In operation, the data processing system 300 employs EPS techniques with an input device 310 and GUI 400 for selecting objects or areas for detailed display to a user on a display screen 340. Data representing an original image or representation is received by the CPU 320 of the data processing system 300. Using EPS techniques, the CPU 320 processes the data in accordance with instructions received from the user via an input device 310 and GUI 400 to produce a detail-in-context presentation. The presentation is presented to the user on a display screen 340. It will be understood that the CPU 320 may apply a transformation to the shoulder region 430 surrounding the region-of-interest 420 to affect blending or folding in accordance with EPS technology. For example, the transformation may map the region-of-interest 420 and/or shoulder region 430 to a pre-defined lens surface, defined by a transformation or distortion function and having a variety of shapes, using EPS techniques. Or, the lens 410 may be simply coextensive with the region-of-interest 420.

The lens control elements of the GUI 400 are adjusted by the user via an input device 310 to control the characteristics of the lens 410 in the detail-in-context presentation. Using an input device 310 such as a mouse, a user adjusts parameters of the lens 410 using icons and scroll bars of the GUI 400 that are displayed over the lens 410 on the display screen 340. The user may also adjust parameters of the image of the full scene. Signals representing input device 310 movements and selections are transmitted to the CPU 320 of the data processing system 300 where they are translated into instructions for lens control.

Moreover, the lens 410 may be added to the presentation before or after the object or area is selected. That is, the user may first add a lens 410 to a presentation or the user may move a pre-existing lens into place over the selected object or area. The lens 410 may be introduced to the original image to form the presentation through the use of a pull-down menu selection, tool bar icon, etc.

Advantageously, by using a detail-in-context lens 410 to select an object or area for detailed information gathering, a user can view a large area (i.e., outside the extent of the lens 410) while focusing in on a smaller area (or within the focal region 420 of the lens 410) surrounding the selected object. This makes it possible for a user to accurately gather detailed information without losing visibility or context of the portion of the original image surrounding the selected object.

Now, the present invention provides a system and method for dynamic width adjustment of detail-in-context lenses, such as EPS lenses, for the purpose of reducing occlusion of information in the lens under certain geometric conditions. In particular, an EPS lens has one view defined displacement vector which is co-linear with the vector from the viewing point to the lens position. All displacements for a given lens occur in the same direction. If they did not, the magnification of the lens would be undefined. Unfortunately, the local viewing direction (i.e., the vector from a given point) to the viewing position can be so different from the displacement direction that occlusion of the shoulder region can occur. For example, and referring to FIGS. 2 and 4, if the focal region 233, 420 is magnified to the extent that it approaches or meets the perimeter 210, 412 of the lens 230, 410, the shoulder region 234, 430 may be occluded. Such an event reduces the ability of the detail-in-context presentation to convey the relationship between the focal region or detail and the surrounding image or context.

Figure 5:
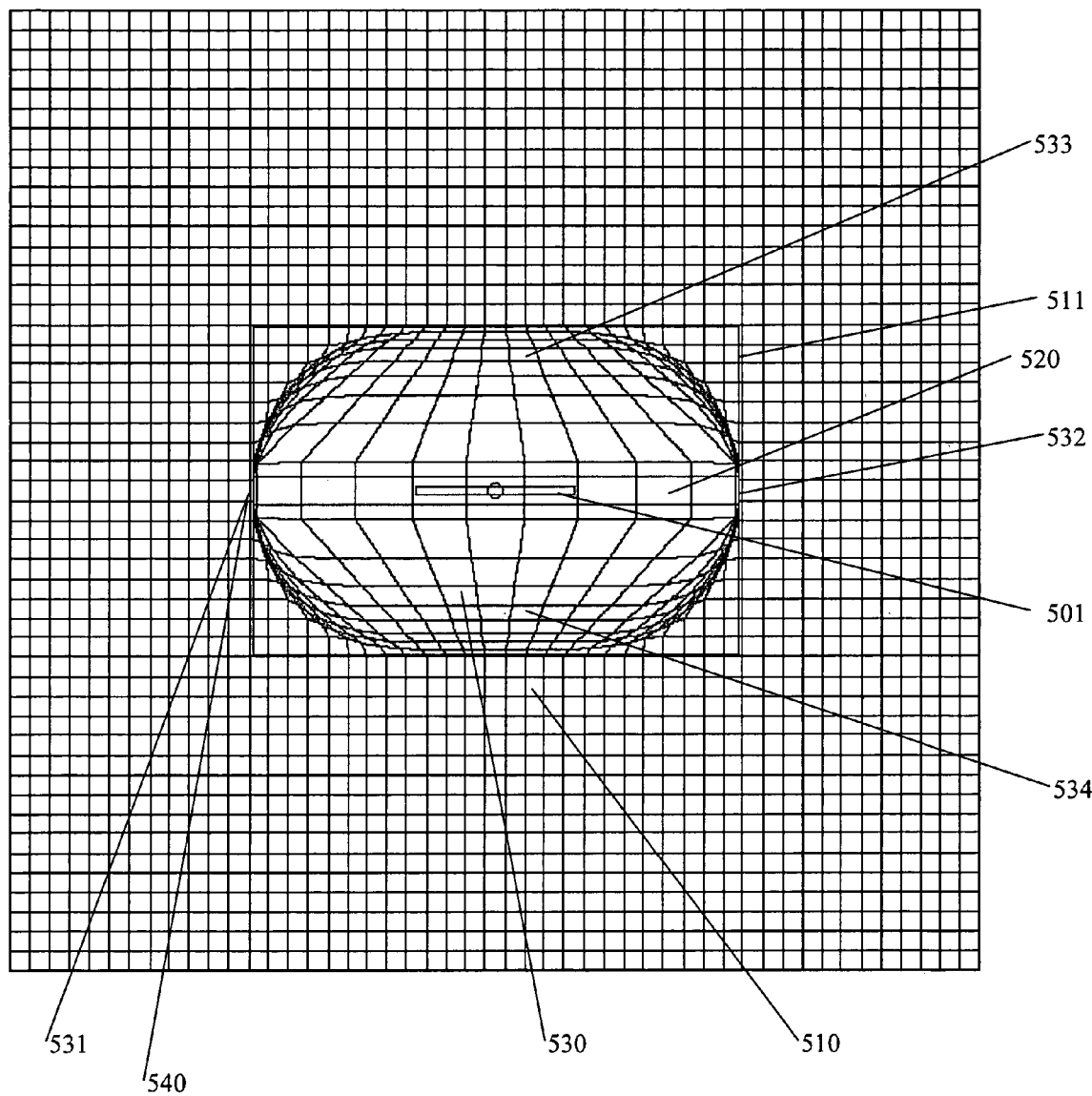
FIG. 5 is a partial screen capture illustrating a detail-in-context lens presentation in which the shoulder region of the lens is occluded in accordance with an embodiment of the invention.

FIG. 5 is a partial screen capture illustrating a detail-in-context lens presentation 500 in which the shoulder region 530 of the lens 510 is occluded in accordance with an embodiment of the invention. In FIG. 5, a lens 510 is shown that is computed from a rectangular focus 501 which is wide but not very high. The inner rectangle 501 is the undisplaced focal region, the surrounding rectangle 520 is the displaced focal region, and outer most rectangle 511 represents the lens bounds. In FIG. 5, upon perspective projection into z=0 of the lens 510, the left and right edges 531, 532 of the displaced focal region 520 are coincident with the left and right edges of the lens bounds 511. As such, occlusion 540 of the shoulder region 530 along these coincident edges occurs. The reason for this occlusion 540 is that the width of the lens 510 is too small. The displacement vector for the lens 510 of FIG. 5 may be represented as [0,0,1]. This displacement causes the undisplaced focal region 501 to move upwards toward the viewpoint by the lens height which causes the context provided by the left and right portions 531, 532 of the shoulder region 530 to be occluded 540. For any given lens this problem increases as the distance from a point to be displaced (i.e., an undisplaced point) to its position in the lens (i.e., a displaced point) increases. This is why there is no occlusion of the top and bottom portions 533, 534 of the shoulder region 530 in FIG. 5. In those portions 533, 534 of the shoulder region 530, maximum displacement is restricted to a relatively small area and the context is spread over a larger screen area.

There are several solutions to this occlusion problem. The first is to use the scoop function described above. The effect of the scoop function is to excavate portions of the shoulder region. To reduce occlusion of the shoulder region 530, the scoop function can be reduced in those areas adjacent to the focal region 520 where magnification is greatest to smoothly reduce the amount of excavation. This may be performed by subtracting a factor of a concave function that smoothly integrates between [0,1]. The downside to this solution is that it sacrifices more important context (i.e., information adjacent to the focal region 520) in favour of less important context (i.e., information adjacent to the lens bounds 511). In other words, context that is near to the focal region 520 is compressed in favour of the context near the lens bounds 511. Furthermore, this solution applies the compression to every part of the shoulder 530. A more optimal solution would be to change only those portions of the shoulder 530 that exhibit occlusion 540. In addition, if the displaced focal region 520 and the lens bounds 511 have some coincident areas, then scoop will be ineffectual in some areas of the lens 510.

A second solution to the occlusion problem is to simply increase the width of the lens 510. This will solve the occlusion problem, however, it will also cause the lens 510 to occupy and unacceptable amount of display screen space or real estate. If such a solution were applied in FIG. 5, for example, the top and bottom shoulders 533, 534 would cover much of a presentation 500 in which the width of the left and right shoulders 531, 532 was increased to reveal occluded information. As such, this cannot be considered an optimal solution.

Thus, the scoop solution allows the size of the lens 510 to remain unchanged but may sacrifice important contextual information. On the other hand, the increased width solution does not sacrifice important contextual information but may exaggerate less important contextual information. What the present invention provides in addition to these two solutions is a method for increasing the width parametrically based on the position of an input point.

Figure 6:
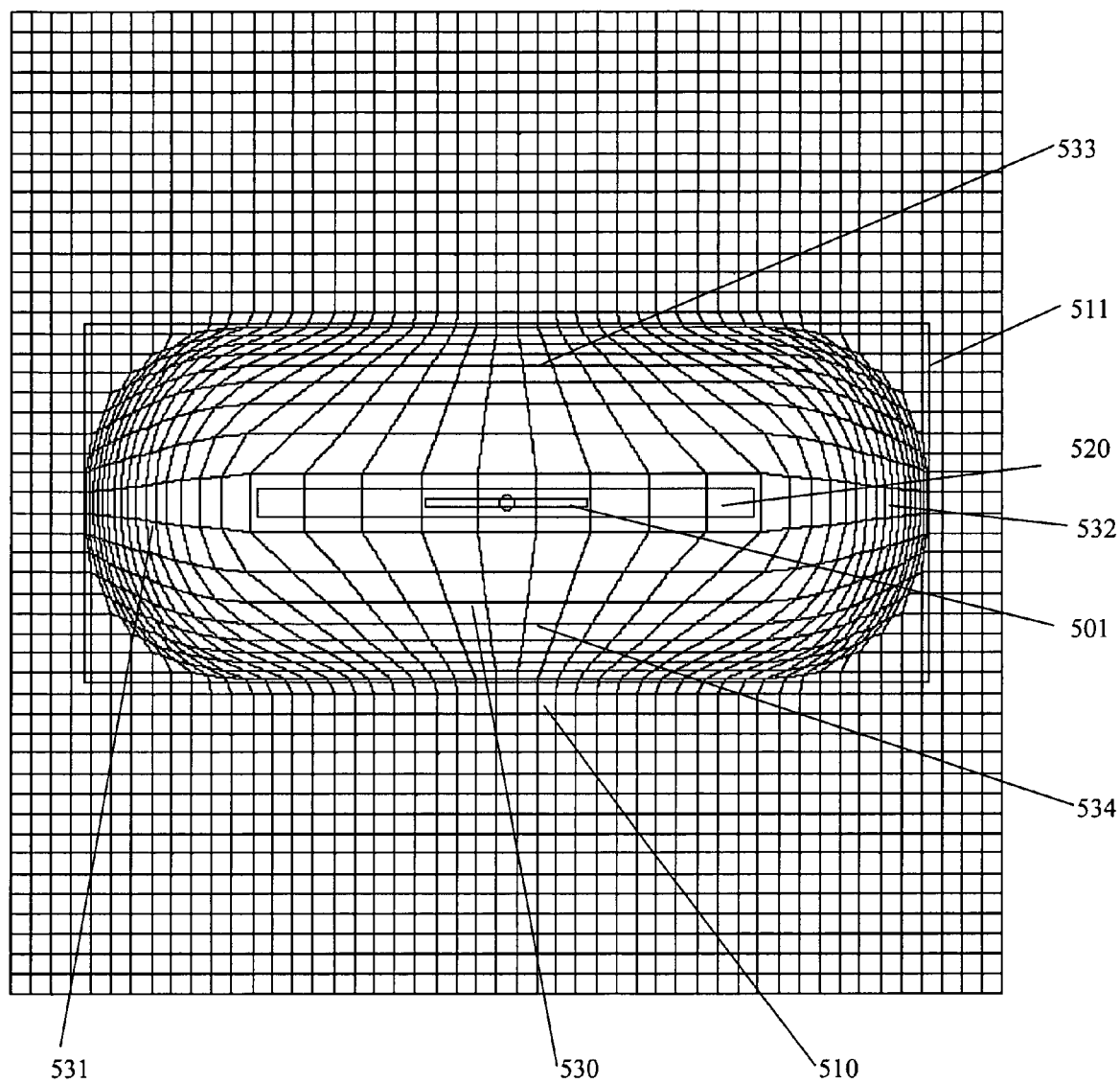
FIG. 6 is a partial screen capture illustrating a detail-in-context lens presentation in which the displaced focal region is used to generate the presentation rather than the undisplaced focal region in order to reduce occlusion in accordance with an embodiment of the invention.

FIG. 6 is a partial screen capture illustrating a detail-in-context lens presentation 600 in which the displaced focal region 520 is used to generate the presentation 600 rather than the undisplaced focal region 501 in order to reduce occlusion in accordance with an embodiment of the invention. In FIG. 6, the shoulder 530 of the lens 510 of FIG. 5 is stretched with respect to the displaced focal region 520 rather than with respect to the undisplaced focal region 501. The left and right shoulders 531, 532 are pushed out so as to provide improved context visualization in these directions, without unnecessarily increasing the size of the top and bottom shoulders 533, 534. However, the distance from the undisplaced focal region 501 to the lens bounds 511 changes across space. That is, the width of the lens changes depending on where the point to be displaced is located. Hence, this solution may be referred to as a "dynamic width" adjustment. The implementation of this dynamic width adjustment is described in the following.

In accordance with the present invention, for each input point in an original image, the displace operation projects the input point to the focal region 501 of the lens 510. The projection is typically to the closest point on the focal region 501. This projection yields a vector from the focal region 501 to the input point. For a rectangular focal region 501 this means that the input point is perpendicularly projected to one of the sides of the rectangle, or to the nearest corner if projection to a side is not possible. The length of this vector in relation to the width of the lens 510 is what determines the input value to a shoulder drop-off function F. In turn, the shoulder drop-off function (a distortion function or component) determines the shape of the cross-section of the shoulders 530 of the lens 510. The shoulder drop-off function F is a monotonically decreasing function with a domain of [0,1] and a range of [0,1]. Examples include a linear function, a sigmoidal function, a hyperbolic function, a quadratic function, etc. The shoulder drop-off function F may be any function that is monotonically decreasing with the range and domain as described.

In order to produce a distorted surface like that shown in FIG. 6, one needs to know the value of the vector or ray R, through the input point, from the projection of the input point to the focal region 501 to the lens bounds 511. This ray R is illustrated in FIG. 7.

Figure 7:
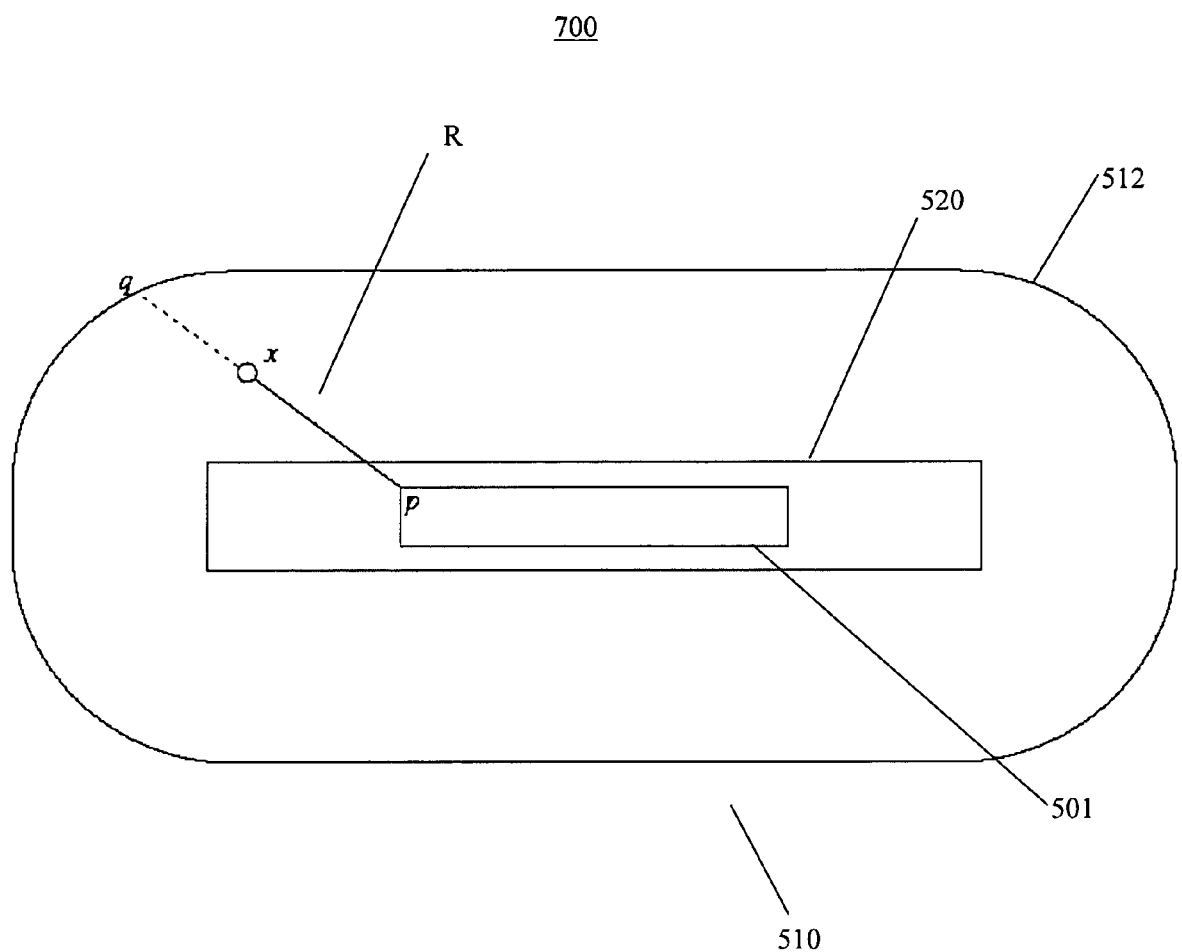
FIG. 7 is a first graphical representation of the geometry for implementing dynamic width adjustment in accordance with an embodiment of the invention.

FIG. 7 is a first graphical representation of the geometry 700 for implementing dynamic width adjustment in accordance with an embodiment of the invention. In FIG. 7, the input point is labelled x. This is the point that a user wishes to compute a displacement for. Again, the undisplaced focal region 501 is the inner rectangle and the displaced focal region 520 is the centre rectangle. The lens base 512 or the perimeter of the desired displacement surface is also illustrated. The point p is the projection of input point x to the focal region. The point that requires computation is the point q at the intersection of a ray R from p through x and the perimeter of the lens 512. The dynamic width for the input point x is then the distance from the point p to the intersection point q. Thus, we know that x is a point between p and q. We will try to find q given that information.

The first step is to find the perimeter 512 of the lens 510. Finding the point q in FIG. 7 is the same as the more general problem of finding the perimeter 512 of the lens 510. That is, knowing how to find one point q on the perimeter given any input point x is the same as knowing how to find the perimeter 512. The problem is solved through manipulating the shoulder drop-off function F. One needs a continuous (and preferably smooth) one-dimensional function (see 1000 in FIG. 10) that is greater than zero for all points inside the lens 510, less than zero for all points outside the lens 510, and equal to zero for all points on the perimeter 512 of the lens 510. This is similar to finding the z component of a three-dimensional displacement in EPS, except that for all points outside the lens 510, the result is zero.

Figure 8:
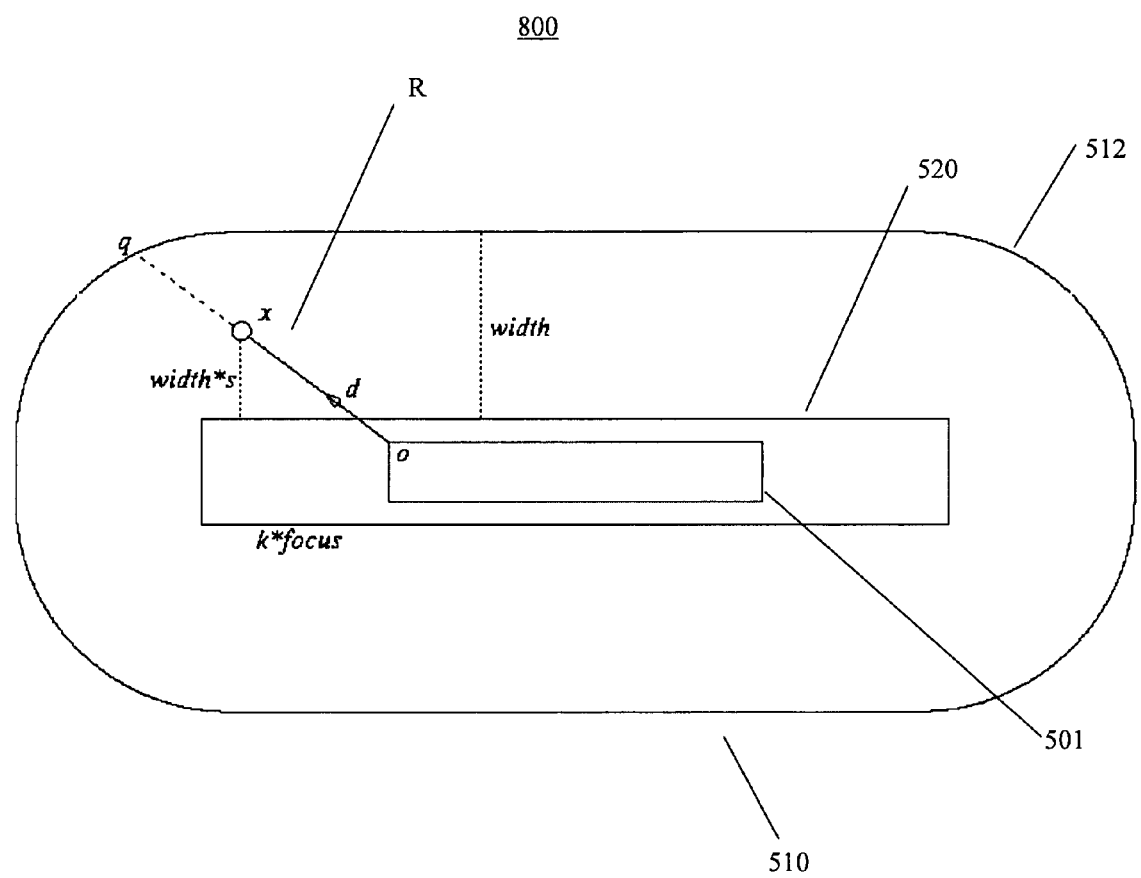
FIG. 8 is a second graphical representation of the geometry for implementing dynamic width adjustment in accordance with an embodiment of the invention.

FIG. 8 is a second graphical representation of the geometry 800 for implementing dynamic width adjustment in accordance with an embodiment of the invention. Referring to FIGS. 7 and 8, a one-to-one function (see 1000 in FIG. 10) can be obtained which returns a scalar value for all points along any line through the lens 510. This function 1000 is dependent on the shoulder drop-off function F. Since the drop-off function F is smooth and monotonic, the function 1000 will also be so given an appropriate range. The function 1000 works by applying the point x=o+t d (where o and d are position and direction definitions of a ray R, respectively, together defining the line through the lens 510) to the shoulder drop-off function F of the lens 510 for input t (a scalar input value). According to one embodiment, o is the nearest distance projection of the input point x to the focus 501. Note that p in FIG. 7 and o in FIG. 8 are the same points, but they are meant for different purposes. Namely, o and d denote the ray R from p through x to q. You could say that R=(o, d), since the ray R is defined by an origin o and a direction d. The direction d is normalized to a unit length.

Now, for all points x, the scalar input value t to our function 1000 is the distance from x to o (i.e., x−o=t d). The first step is to project x to the closest point o on the focal region 501 and measure the distance from x to that point o. When x is projected to the focal region 501, the projection is the vector [0,0] for all points x inside the focal region 501. This implies that d will be [0,0] if x is in the focus 501. If this is the case, no dynamic adjustment of the width needs to occur for x. Let s=t |width, where width is the value for the default width of the lens 510. If s=0, then x is in the focus 501 and no further computation is required as no adjustment of width is required. If s>1, then x is outside of the lens 510 and 1−s is returned. Otherwise, x is outside the focus 501 but inside the lens 510 and we can return F(s), where F is the shoulder drop-off function for the lens 510. The result of this is a function 1000 similar to that shown in FIG. 10.

Figure 10:
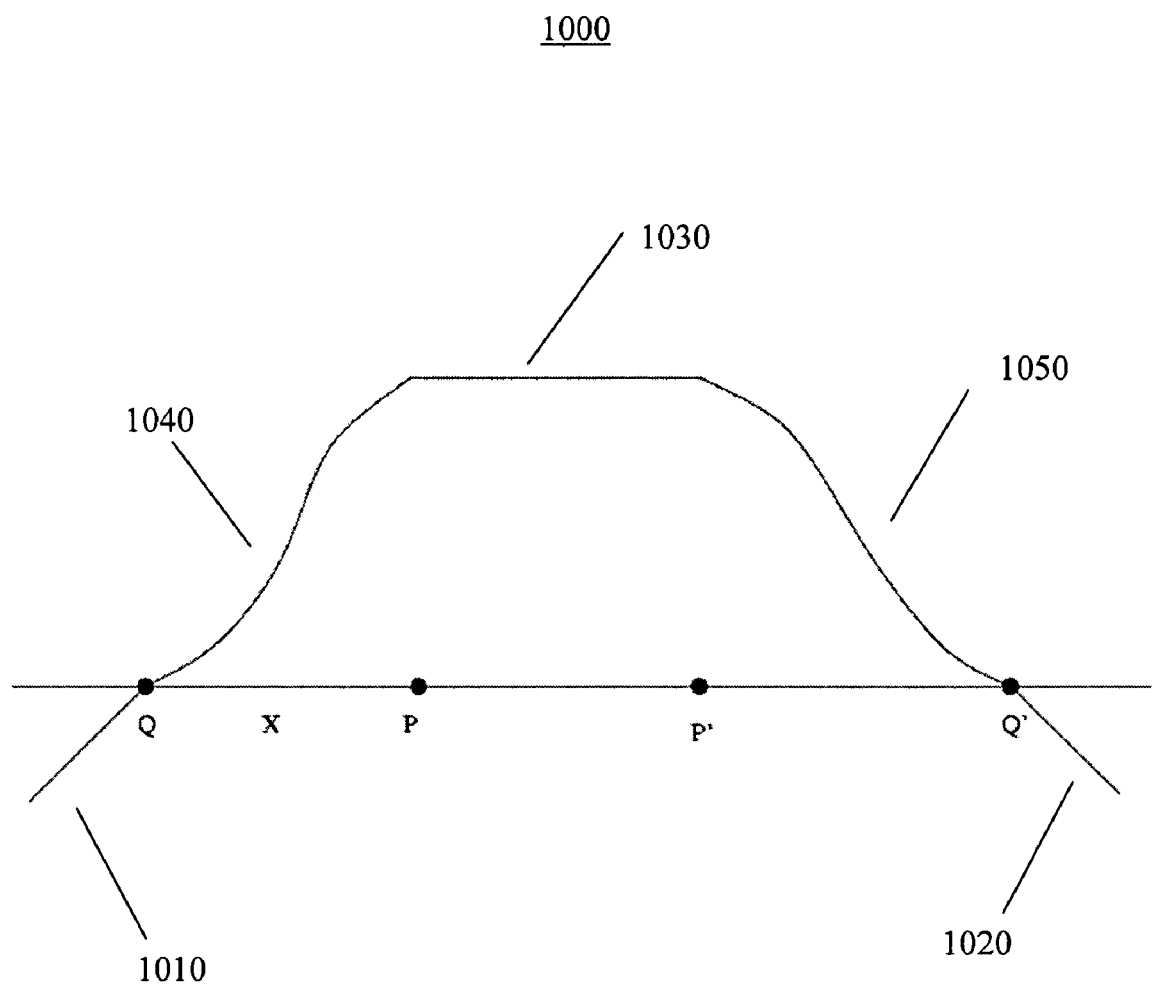

FIG. 10 is a graphical representation of a function 1000 for implementing dynamic width adjustment in accordance with an embodiment of the invention. Points x, p, and q from FIG. 7 appear in FIG. 10 as do points p' and q'. The points p' and q' are the other intersections of the line that passes through p and q with the focal region 501 and the lens perimeter 512. The function 1000 has a linearly decreasing slope of 1 or −1 outside 1010, 1020 of the lens 510, inside 1030, 1040, 1050 the lens 510 the function is >0, inside 1030 the focal region 501 the function 1000 is 1, everywhere else 1040, 1050 it is some value of the shoulder drop-off function F. As shown in FIG. 10, the shoulder drop-off 1040, 1050 is sigmoidal (S shaped). The shoulder drop-off 1040, 1050 may also be a straight line, etc., or any other shape so long as it is continuous and monotonic. Preferably, it is also smooth.

Thus the function 1000 drops from 1 to 0 as points x along o+t d move from o to q. Beyond the lens perimeter 512 the value decreases linearly. The function 1000 is continuous across the boundary but there will likely be a discontinuity in the first derivative. Now, to find the point q where s=1, we need to employ a root finding algorithm. This is the standard displacement method (see above) with the addition of linearly decreasing negative values 1010, 1020 outside the lens 510, and the removal of the scaling of the lens function value by the height of the lens height (which causes the appropriate magnification). The lens function D has a range of [0,1], a domain of [0,1], and is monotonic. The function 1000 is continuous enough for most root finding methods and has only a single maxima. This makes it straight forward to solve for the zeroes along the line o+t d. Hence, it also allows us to compute the intersection of a ray R from the focal region 501 to any point q on the perimeter 512 of the lens 510 in any direction.

The remaining steps for implementing dynamic width adjustment will be described next. The next step is to find the point o. For our input point x we use the perimeter point on the focal region 501 that x projects to as o. If x is in the focal region 501, then one need not continue since the width of the lens is irrelevant. Having found o, we can calculate a d in the direction of x. This also gives us the ancillary benefit that the function 1000 described above is monotonically decreasing with t>0 and as such we do not need to find a maximum to bracket the root. Running a root solver to find the perimeter 512 of the lens 510 at this point is unnecessary as the perimeter 512 is simply given by o+width * d. However, this is not the perimeter we are looking for, rather, we want the perimeter 512 resulting from a lens where the focal region 501 is the size of the displaced focal region 520. Thus, we must scale the focal region 501 by the magnification of the lens 510 in its object space. To find the perimeter 512 with this altered focal region 520 one must employ a root finder. It should be noted that while scaling the focal region 501 by the magnification of the lens 510 is beneficial, it may not be sufficient to overcome extreme shoulder occlusion. In addition, it may provide an over adjustment. For these reasons, a user-defined parameter k (where k>0) may be used to denote a value for scaling the focal region 501. Note that the function 1000 is similar for both scaled on non-scaled focal regions 501, 520. The effect of scaling is to spread the focal region 520 out in the domain of the lens 510, but the domain of the function 1000 remains the same.

To reiterate, the point x is the point along o+t d for which a projection to the scaled focal region 520 is to be computed. The scalar s is the length of that projection inversely scaled by the default width of the lens width. When s becomes 1 we have found the perimeter 512 of the lens 510 with the scaled focal region 520.

According to one embodiment, the Brents method is used to find the root of the scalar function 1000 described above with respect to finding lens boundaries 512. The Brents method is well-known to those of ordinary skill in the art of numerical analysis and is not described in detail here. The Brents method requires a pre-step to bracket the root. One suitable bracket is given by [o, o+width*m*k* d], where m is the current magnification of the lens 510. The second bracket point should fall outside the lens 510. Knowing what we do about d, one can determine if these points do bracket the root. In order to know if the computed brackets actually bracket a zero, one only needs to compute the value of the function 1000 at the proposed bracket points. The function 1000 is continuous and monotonic, so if the value is >0 at one bracket point, and <0 at the other bracket point, then at some point on the function 1000 it crosses through 0. The root finder may be started with 0.5 as the root to polish. If a different root finding algorithm is used, then this step may not be required. The root finder typically uses iteration to find q. In addition to the Brents method, other root finding methods such as Newton-Raphson, bisection, etc., may be used.

If RF represents the calling of a root finder, we can now write q=o+RF*d, or, q=o+i*d, where i is a scalar value which is found by the root finder RF. Thus, x=o+t*d, where 0<t<i.

An ancillary computation that can be paired with dynamic width adjustment is computing the bounding rectangle 512 (see FIGS. 5 and 6) of the lens 510. This does not require iteration. Typically the bounding rectangle 512 for a lens 510 is the bounding box for the focal region 520 expanded by the width parameter. If dynamic width adjustment is enabled, the bounding rectangle 512 must be scaled by the factor k before expansion.

Thus, the present invention provides a method for computing a dynamic width for a given point for a detail-in-context lens presentation. The method uses a root finder on a function for which most super-linear convergent root finding algorithms are appropriate. The Brents method is suggested as there is a discontinuity in the first derivative of this function but other methods and optimizations may also be used. One optimization of the above method is to return s instead of F(s), where F is the shoulder drop-off function. This has the benefit of reducing the function 1000 to piecewise linear and making it efficient to find roots (e.g., no iteration required). However, to cover most situations, the shoulder drop-off function F should be used as in some situations the assumption of returning s to give a linear function may not be appropriate.

Since the method requires iterative root solving, performance may be an issue for presentations requiring the displacement of a large number of points. Performance is also affected by the choice of shoulder drop-off function F. As mentioned above, using a linear shoulder drop-off function F presents the easiest function for the root finder and hence convergence is quite rapid. As the function becomes more complicated, with possibly multiple inflections, performance may degrade. Performance may be improved by disabling the dynamic width adjustment function while the lens 510 is being interacted with (e.g., moved, adjusted with the GUI 400, etc.). Rather than disabling the function, performance may also be improved by scaling the focal region 501, 520 while the interaction is taking place.

Figure 9:
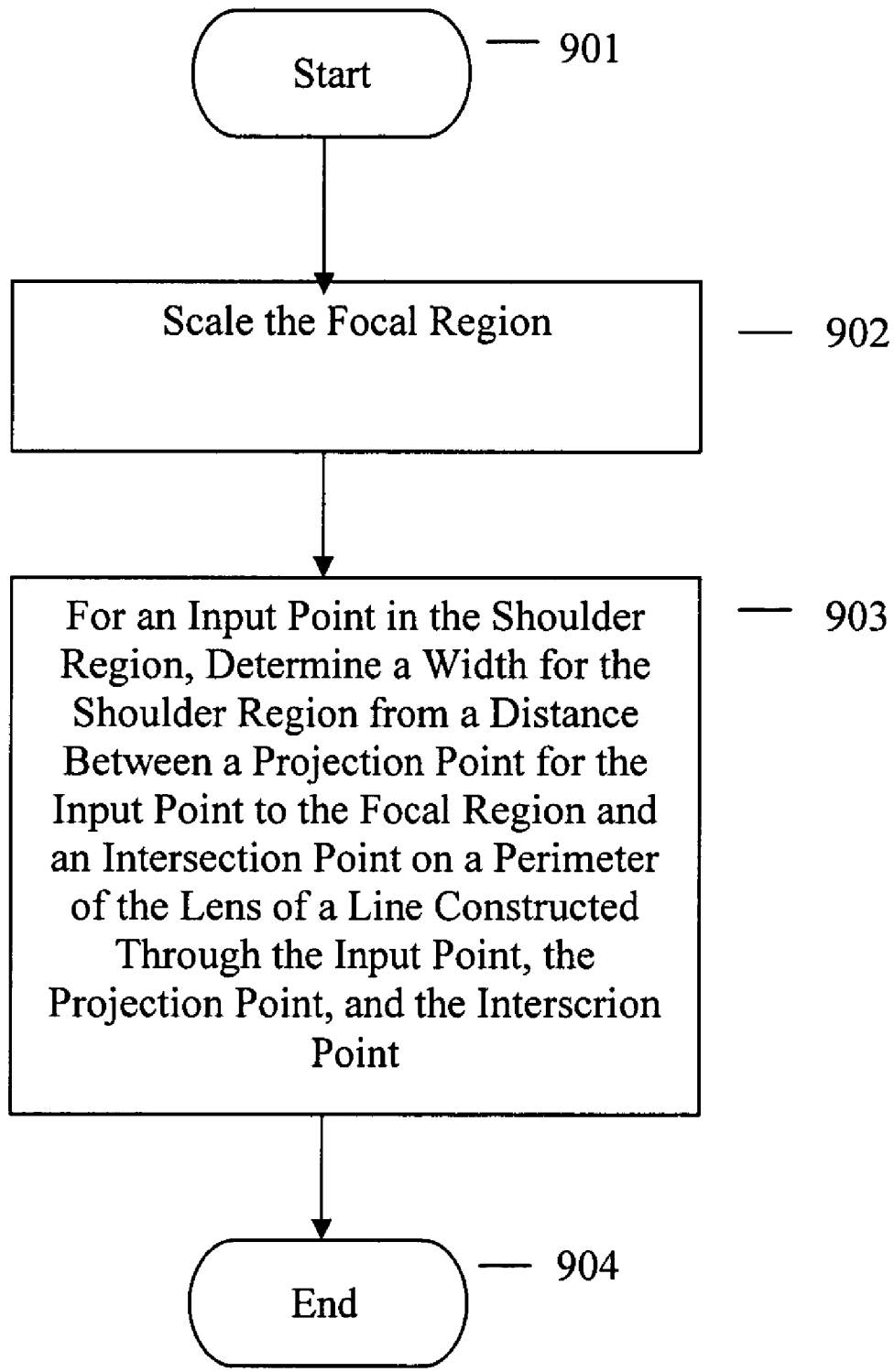
FIG. 9 is a flow chart illustrating operations of software modules within the memory of the data processing system for reducing occlusion in a presentation of a region-of-interest of an original image, the presentation generated by distorting the original image to produce a lens having a focal region for the region-of-interest at least partially surrounded by a shoulder region defined by a shoulder drop-of function, in accordance with an embodiment of the invention; and, FIG. 10 is a graphical representation of a function for implementing dynamic width adjustment in accordance with an embodiment of the invention.

The above described method may be summarized with the aid of a flowchart. FIG. 9 is a flow chart illustrating operations 900 of software modules 331 within the memory 330 of the data processing system 300 for reducing occlusion in a presentation 600 of a region-of-interest 501 of an original image, the presentation 600 generated by distorting the original image to produce a lens 510 having a focal region 520 for the region-of-interest 501 at least partially surrounded by a shoulder region 530 defined by a shoulder drop-of function F, in accordance with an embodiment of the invention.

At step 901, the operations 900 start.

At step 902, the focal region 520 is scaled by k.

At step 903, for an input point x in the shoulder region 520, a width for the shoulder region 530 is determined from a distance between a projection point o for the input point x to the focal region 520 and an intersection point q on a perimeter 512 of the lens 510 of a line R constructed through the input point x, the projection point o, and the intersection point q, to thereby reduce occlusion 540 of the shoulder region 530 by the focal region 520.

At step 904, the operations 900 end.

Preferably, the method further includes determining the projection point o by projecting the input point x to a nearest point on the focal region 520. Preferably, the method further includes determining the intersection point q by finding a root (s=1) for a function 1000 defined by the shoulder drop-off function F(s) and a difference x–o between the input point x and the projection point o. Preferably, the finding is performed by a root finding algorithm. Preferably, the method further includes determining first and second bracketing points for the root. Preferably, the root finding algorithm is Brents algorithm. Preferably, the shoulder drop-off function F is smooth. Preferably, the shoulder drop-off function F is monotonic. Preferably, the method further includes displaying the presentation 600 on a display screen 340. Preferably, the method further includes displaying a graphical user interface ("GUI") 400 over the lens 510 for adjusting the lens 510. Preferably, the GUI 400 has means for adjusting at least one of: a magnification for the focal region 520; a degree of scooping for the shoulder region 530; a size and a shape for the focal region 520; a size and a shape for the perimeter 511, 512; a location for the lens 510 within the original image; a location for the perimeter 511, 512 within the original image; and, a location for the focal region 520 relative to the perimeter 511, 512. Preferably, the adjusting is performed by moving a cursor 401 on the display screen 340 with a pointing device 310. Preferably, at least some of the means are icons 450, 412, 411, 421, 481, 482, 491, 440.

While this invention is primarily discussed as a method, a person of ordinary skill in the art will understand that the apparatus discussed above with reference to a data processing system 300, may be programmed to enable the practice of the method of the invention. Moreover, an article of manufacture for use with a data processing system 300, such as a pre-recorded storage device or other similar computer readable medium including program instructions recorded thereon, may direct the data processing system 300 to facilitate the practice of the method of the invention. It is understood that such apparatus and articles of manufacture also come within the scope of the invention.

In particular, the sequences of instructions which when executed cause the method described herein to be performed by the exemplary data processing system 300 of FIG. 3 can be contained in a data carrier product according to one embodiment of the invention. This data carrier product can be loaded into and run by the exemplary data processing system 300 of FIG. 3. In addition, the sequences of instructions which when executed cause the method described herein to be performed by the exemplary data processing system 300 of FIG. 3 can be contained in a computer software product according to one embodiment of the invention. This computer software product can be loaded into and run by the exemplary data processing system 300 of FIG. 3. Moreover, the sequences of instructions which when executed cause the method described herein to be performed by the exemplary data processing system 300 of FIG. 3 can be contained in an integrated circuit product including a coprocessor or memory according to one embodiment of the invention. This integrated circuit product can be installed in the exemplary data processing system 300 of FIG. 3.

The embodiments of the invention described above are intended to be exemplary only. The scope of the invention is therefore intended to be limited solely by the scope of the appended claims.

What is claimed is:

1. A method for reducing occlusion in a presentation of a region-of-interest of an original image, the presentation generated by displacing the original image onto a lens having a focal region with a magnification for the region-of-interest at least partially surrounded by a shoulder region having an original width and a decrease in the magnification defined by a shoulder drop-off function, comprising:

scaling an undisplaced focal region in the original image corresponding to the focal region of the presentation by the magnification of the focal region; and, for an input point in the shoulder region, determining an adjusted width for the shoulder region for the input point from a distance between a projection point for the input point to the scaled undisplaced focal region and an intersection point on a perimeter of the shoulder region having the adjusted width of a line constructed through the input point and the projection point, wherein the intersection point is determined as a zero of the shoulder drop-off function evaluated along the line constructed through the input point and the projection point, to thereby reduce occlusion of the shoulder region by the focal region by substituting the adjusted width for the shoulder region for the original width in the presentation.

2. The method of claim 1 and further comprising determining the projection point by projecting the input point to a nearest point on the scaled undisplaced focal region.

3. The method of claim 1 wherein the zero is determined by a root finding algorithm.

4. The method of claim 3 and further comprising determining first and second bracketing points for the root.

5. The method of claim 3 wherein the root finding algorithm is Brents algorithm.

6. The method of claim 1 wherein the shoulder drop-off function is smooth.

7. The method of claim 1 wherein the shoulder drop-off function is monotonic.

8. The method of claim 1 and further comprising displaying the presentation on a display screen.

9. The method of claim 8 and further comprising displaying a graphical user interface ("GUI") over the lens for adjusting the lens.

10. The method of claim 9 wherein the GUI has means for adjusting at least one of: a magnification for the focal region; a degree of concavity for the shoulder region; a size and a shape for the focal region; a size and a shape for the perimeter; a location for the lens within the original image; a location for the perimeter within the original image; and, a location for the focal region relative to the perimeter to define a degree and a direction of a folding for the lens.

11. The method of claim 10 wherein the adjusting is performed by moving a cursor on the display screen with a pointing device.

12. The method of claim 10 wherein at least some of the means are icons.

13. A system for reducing occlusion in a presentation of a region-of-interest of an original image, the presentation generated by displacing the original image onto a lens having a focal region with a magnification for the region-of-interest at least partially surrounded by a shoulder region having an original width and a decrease in the magnification defined by a shoulder drop-off function, comprising:
    means for scaling an undisplaced focal region in the original image corresponding to the focal region of the presentation by the magnification of the focal region; and,
    means for, for a point in the shoulder region, determining an adjusted width for the shoulder region for the input point from a distance between a projection point for the point to the scaled undisplaced focal region and an intersection point on a perimeter of the shoulder region having the adjusted width of a line constructed through the input point and the projection point, wherein the intersection point is determined as a zero of the shoulder drop-off function evaluated along the line constructed through the input point and the projection point, to thereby reduce occlusion of the shoulder region by the focal region by substituting the adjusted width for the shoulder region for the original width in the presentation.

14. A computer program product having a computer readable medium tangibly embodying computer executable code for directing a data processing system to reduce occlusion in a presentation of a region-of-interest of an original image, the presentation generated by displacing the original image onto a lens having a focal region with a magnification for the region-of-interest at least partially surrounded by a shoulder region having an original width and a decrease in the magnification defined by a shoulder drop-off function, comprising:
    code for scaling an undisplaced focal region in the original image corresponding to the focal region of the presentation by the magnification of the focal region; and,
    code for, for a point in the shoulder region, determining an adjusted width for the shoulder region for the input point from a distance between a projection point for the point to the scaled undisplaced focal region and an intersection point on a perimeter of the shoulder region having the adjusted width of a line constructed through the input point and the projection point, wherein the intersection point is determined as a zero of the shoulder drop-off function evaluated along the line constructed through the input point and the projection point, to thereby reduce occlusion of the shoulder region by the focal region by substituting the adjusted width for the shoulder region for the original width in the presentation.

* * * * *

UNITED STATES PATENT AND TRADEMARK OFFICE
CERTIFICATE OF CORRECTION

PATENT NO.         : 7,312,806 B2  
APPLICATION NO. : 11/041920  
DATED                : December 25, 2007  
INVENTOR(S)       : Mark H. A. Tigges It is certified that error appears in the above-identified patent and that said Letters Patent is hereby corrected as shown below:

Abstract, line 6: Replace the word "drop-of" with the word --drop-off--.

Column 1, line 62: Replace the word "drop-of" with the word --drop-off--.

Column 3, line 13: Replace the word "drop-of" with the word --drop-off--.

Column 19, line 26: Replace the word "drop-of" with the word --drop-off--.

Signed and Sealed this

Twenty-ninth Day of April, 2008

JON W. DUDAS  
*Director of the United States Patent and Trademark Office*